No. 864,967.  PATENTED SEPT. 3, 1907.
R. O. HAMMOND.
WATER MOTOR.
APPLICATION FILED APR. 22, 1907.
2 SHEETS—SHEET 1.
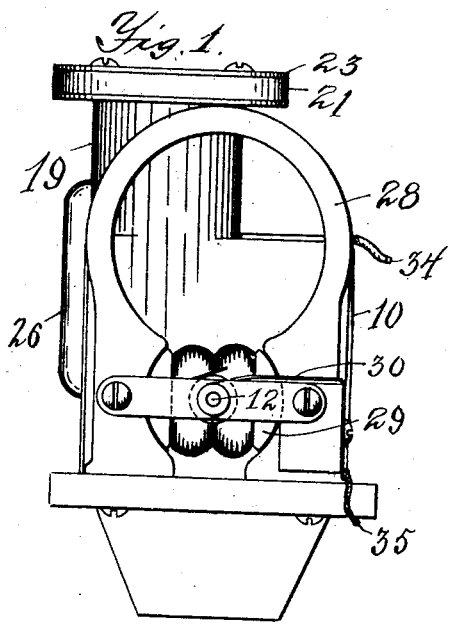
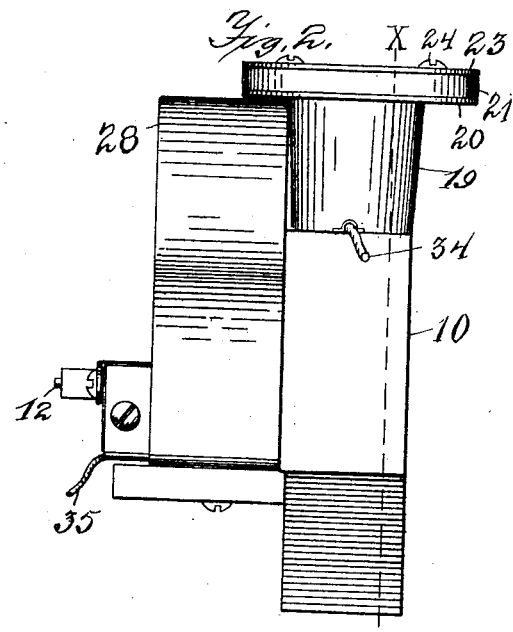
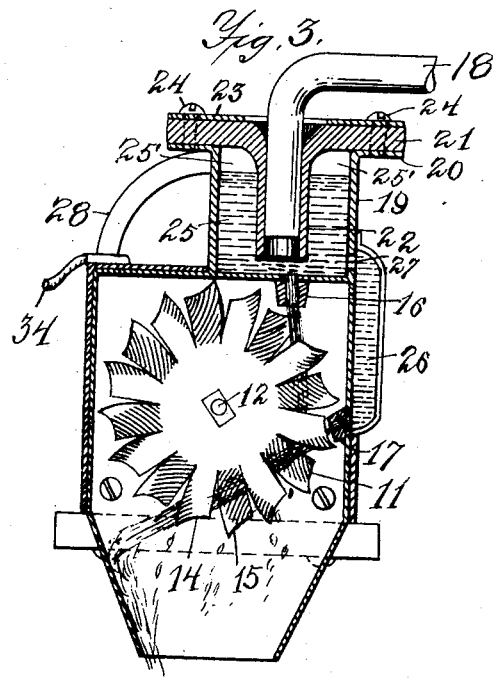
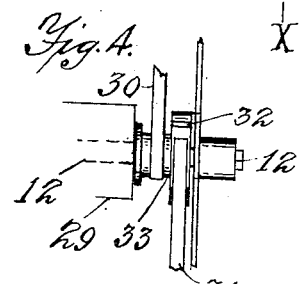
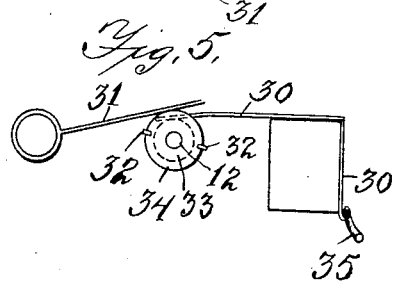
Witnesses
I. A. Elsworth
A. W. Kettle
Inventor
Robert O. Hammond
By S. Arthur Baldwin,
Attorney

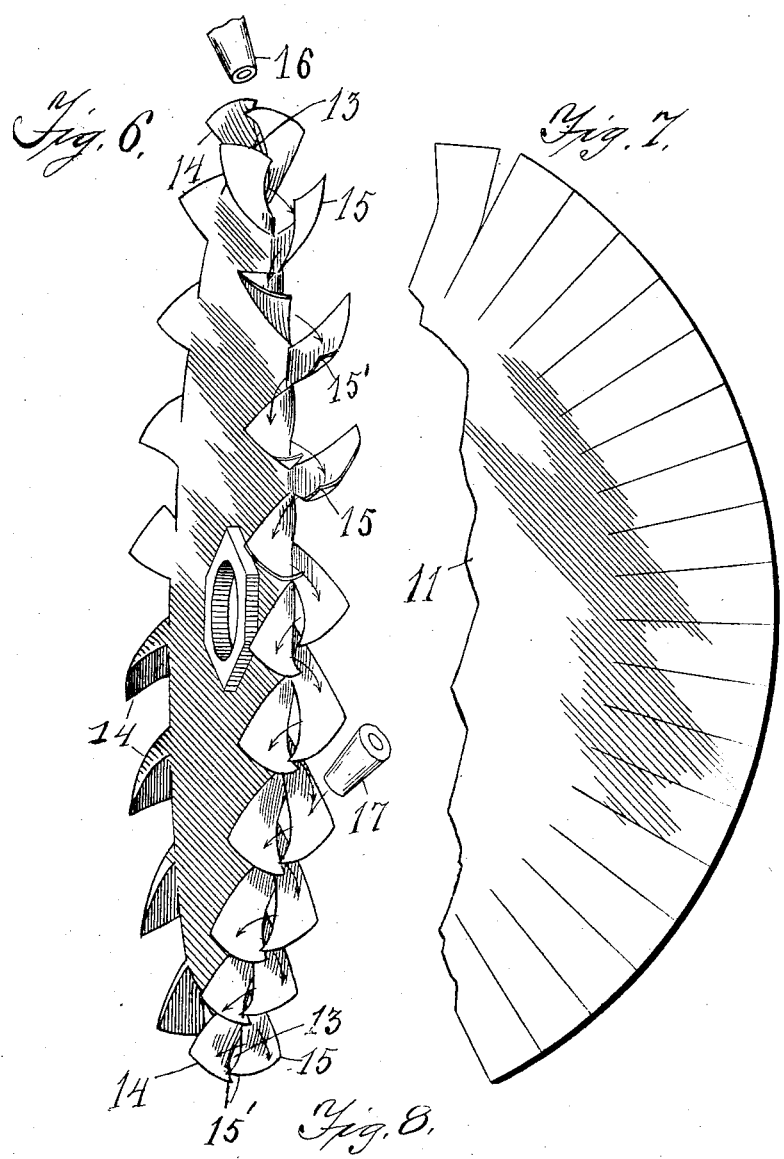

UNITED STATES PATENT OFFICE.

ROBERT O. HAMMOND, OF JAMESTOWN, NEW YORK, ASSIGNOR TO ROCHESTER ELECTRIC SPECIALTY COMPANY, A CORPORATION OF NEW YORK.

WATER-MOTOR.

No. 864,967.      Specification of Letters Patent.      Patented Sept. 3, 1907.

Application filed April 22, 1907. Serial No. 369,485.

*To all whom it may concern:*

Be it known that I, ROBERT O. HAMMOND, a citizen of the United States, residing at Jamestown, county of Chautauqua, and State of New York, have invented new and useful Improvements in Water-Motors, of which the following, taken in connection with the accompanying drawing, is a full, clear, and exact description.

The invention relates to motors and particularly water motors for running dynamos and like machines which need a steady motion with high speed; the object of the invention is to provide a water or impact motor attachable to a spigot and so arranged that great speed and power can be attained within small space and with a small amount of water under high pressure, also providing the steady even motion necessary for a dynamo and in such a manner that the dynamo can be directly driven by said motor; all of which will be fully set forth in the following specification and claims.

In the drawings, Figure 1 is a side elevation of the motor and dynamo placed side by side and facing the dynamo. Fig. 2 is an end elevation of the dynamo and motor placed side by side. Fig. 3 is a sectional view of the motor at line X X in Fig. 2, showing the method of attachment to the spigot, and the manner of admitting the water to the wheel. Fig. 4 is a plan view of the commutator and ends of the brushes. Fig. 5 is a detail of the arrangement of the brushes on the commutator of the dynamo. Fig. 6 is an edgewise perspective view of the improved water wheel showing the peculiar interinclined dished form of the buckets with their interlapped outer ends. Fig. 7 is a section of the disk with the radial cuts therein for the buckets before they are turned into the alternating and concave form. Fig. 8 gives detail views of the attached buckets.

Similar numerals refer to corresponding parts in the several views.

The numeral 10 indicates a metal case within which the water wheel 11 is revolubly mounted on the shaft 12. Water wheel 11 comprises a sheet metal disk having the buckets 14 and 15 made integral with the sheet metal disk and formed by radially slitting the disk for the desired distance from the edge forming fan shaped sections, and then twisting each section alternately to the right and left so as to form two series of buckets 14 and 15. Said buckets are inclined alternately toward each other and are given a hollow half-spoon or cup shape, with the open side toward the center, which side is curved so as to confine the stream of water and direct it on to the opposite bucket. This curve of the bucket is preferably more abrupt near the outer point 15' on the inner side in order to confine the stream as near to the outer periphery of the wheel as possible and thereby on account of the distance from the center of the wheel get as great a leverage as possible. The buckets, as above stated are dished or concaved into the half-spoon-shape. They are also interdished, that is, curved toward one another so that the points 15' interlap when the wheel is viewed edgewise, as shown at the top and bottom in Fig. 6. This interlapping of the points forms a small opening 13 between the buckets when the wheel is so viewed. The interdished form of the buckets conserve the force of the entire stream not allowing it to splash or be wasted. Thus the water from the nozzle 16 strikes the first bucket 14 with a glancing blow similar to the manner in which a ball will strike a bat and glance from it with added speed. The moving wheel aids this action of the stream. The force of the water is thus thrown from one bucket to the opposite bucket and from that the stream glances back on to the next, the reactionary force of said stream engaging the wheel for from one-fourth to one-third of its circumference.

The curved inner edges of the buckets 14 and 15 are so placed as to form a small opening 13 between them, when the wheel is viewed edgewise, as shown in Fig. 4, and the nozzles 16 and 17 are so placed that the edge of the streams from said nozzles enter said opening 13 and leads the stream of water so that the wheel more easily clears itself of the water, and force and a high speed are given to the water wheel. It is found that when the buckets 14 and 15 are placed at right angles to the stream of water, or even where they are slightly inclined toward one another, it is hard for the wheel to clear itself and though force may be added to the wheel, it is difficult to give high speed and clearance at the same time. The arrangement of the wheel as above described gives both these desirable qualities.

A second nozzle 17 is inserted in casing 10 at that point at which the first stream begins to lose its force and acts in the same manner as the first stream for a similar portion of the wheel. It is thus apparent that three or four such jets or streams might be used on the different sides of the wheel providing the casing 10 were made sufficiently large to care for and carry off such an amount of water. The obtaining of an even pressure from the different streams is attained by my improved manner of attaching to the spigot 18 whereby an air and water pressure chamber 25 is provided about the spigot. The casing 10 for the wheel is continued upward in a tubular portion 19 and outward in flange 20. The lower end of tube 19 is closed and nozzle 16 is inserted in said closure. A rubber insulating washer 21, corresponding in size to flange 20, is provided, having its central portion 22 formed in a tube and extending downward within the chamber 25 formed within tube 19. A metal washer 23 is provided above rubber washer 21 and attached through rubber washer 21 to flange 20, thereby holding rubber washer 21 firmly in place. Inner tube 22 is slightly smaller than the size of the spigot so that it stretches on to the same and has some holding power. This is insufficient, however, to hold the same under high pressure. I accordingly make the chamber 25 within tube 19 considerably larger than rubber tube 22 which tube does not extend to the bottom of said chamber, so that the water is admitted to chamber 25 under high pressure and acts as a binding force on the outside of tube 22 to hold the tube on the end of spigot 18. The water forces the air into the upper part 25' of chamber 25 and the air acts the same as the water in binding the tube 22 on to the spigot.

An additional nozzle 17 is provided with a conduit 26 leading from chamber 25 through the opening 27 so that the pressure of water within conduit 26 is the same as in chamber 25 and will pass through nozzle 17 with the same force as through nozzle 16. Nozzle 17 is placed at about that point where the force from the stream from nozzle 16 begins to fail and is directed across the segment of the wheel next below the segment acted upon by the stream from nozzle 16. On account of the peculiar power of clearance possessed by the shape of the buckets 14 and 15 a number of streams may thus be admitted to the wheel imparting additional force thereto provided the casing 10 is made sufficiently large to accommodate the amount of water forced into it. Additional conduits similar to 26 may be provided on the opposite side of the wheel with their proper nozzles without departing from my invention.

The dynamo 28 is preferably of the common horseshoe type with a suitable field for the revolubly mounted armature 29. The commutator 33 has the enlarged end 34 with the blocks 32 of insulating material on the periphery of the same to form insulating brakes and thereby give an alternate current to the brush 31, the contact of the brush 31 being broken by brakes 32 as the commutator is revolved by shaft 12. Brush 30 has a positive contact on the commutator. Armature 29 is connected to commutator 33 by a suitable wire and the current is taken from the field by wire 34 and from the commutator by wire 35 inserted in the end of brush 30. The dynamo 28 is attached to case 10 by suitable screws so that the case 10 is magnetized and becomes a part of the field so that the current may be taken from any portion of case 10. Wire 34, as shown, is taken from the top of the case which is a convenient place. The shaft 12 bearing water wheel 11 extends through the partition in the case 10 which separates the dynamo from the water wheel and revolubly supports the commutator 33 within the dynamo, the partition between the dynamo and water wheel being so packed as not to allow the moisture entering the dynamo around shaft 12. It is apparent that this gives a direct drive from the water wheel to the dynamo and the attachment to spigot 18 is completely insulated by rubber gasket 21 with its tubular central portion 22.

It is apparent that other fluids under pressure besides water may be used in this motor, such as air, and the same reactionary action will be produced as with water.

I claim as new:—

1. In a water motor, a wheel, interdished buckets around the periphery of said wheel each having a curved open side toward the next bucket to conserve the force of the stream and direct its course.

2. In a water motor, a wheel, interdished buckets arranged alternately and obliquely as to one another on the periphery of said wheel to give the water reactionary force from one bucket to another, said buckets each having a curved open side toward the next bucket to confine the stream.

3. In a water motor, a wheel composed of a disk having radial cuts in the outer edge to form buckets, said buckets turned alternately and obliquely opposite to one another and interdished with an open curved inner side to conserve the entire stream and give it an alternating impact on said buckets.

4. A water motor consisting of a suitable casing, a water wheel revolubly mounted in said casing, a rubber tube to connect said casing to the water faucet, a pressure chamber in said casing around said tube to hold the same on the spigot, and a nozzle from said chamber to direct the water onto said wheel.

5. A water motor consisting of a suitable casing, a water wheel revolubly mounted in said casing, a pressure chamber in said casing having an opening therefrom to said wheel, and a rubber closure for said pressure chamber having a central tube extending into said pressure chamber for attachment to the spigot, substantially as and for the purpose specified.

6. In a water motor, a casing, a water wheel revolubly mounted in said casing, a pressure chamber on said casing, an insulated attachment to the spigot from said pressure chamber, a conduit on said casing from said pressure chamber and having connection therewith, and a plurality of openings from said pressure chamber and conduit onto said wheel to turn the same.

7. The combination of a suitable casing, a water wheel revolubly mounted in said casing, means for admitting the water to said wheel, a dynamo actuated by said water wheel, said casing attached to the field of said dynamo to form a part of said field, substantially as shown.

8. In a water motor, a casing 10, a pressure chamber 19 on said casing, a rubber washer 21 and metal washer 23 to close said pressure chamber, a central tube 22 on said rubber washer extending into said chamber for attachment to the spigot, a water wheel 11 revolubly mounted in said casing, and an opening 16 in said pressure chamber to said wheel.

9. In a water motor, a casing 10, a pressure chamber 19 on said casing, a rubber washer 21 and metal washer 23 to close said pressure chamber, a tubular central portion 22 to said rubber washer extending into said chamber for attachment to the spigot, a conduit 26 leading from said pressure chamber and having connection therewith, a water wheel 11 revolubly mounted in said casing, and nozzles 16 from said pressure chamber and 17 from said conduit for different portions of said wheel.

10. The combination of a casing 10, an insulated attachment to the spigot for said casing, a water wheel 11 revolubly mounted on a suitable shaft in said casing, an armature 29 mounted on said water wheel shaft, a field 28 for said armature, said casing attached to said field to form a part thereof, and a suitable commutator and brushes and connections for said dynamo, substantially as and for the purpose specified.

In testimony whereof I have signed my name to this specification in the presence of two subscribing witnesses.

ROBERT O. HAMMOND.

Witnesses:
I. A. ELSWORTH,
ALFRED L. FURLOW.